No. 641,405. Patented Jan. 16, 1900.
T. O. PERRY.
FLUID ACTUATED MOTOR FOR ACTUATING FLUIDS.
(Application filed Sept. 9, 1897.)
(No Model.) 4 Sheets—Sheet 1.

No. 641,405. Patented Jan. 16, 1900.
T. O. PERRY.
FLUID ACTUATED MOTOR FOR ACTUATING FLUIDS.
(Application filed Sept. 9, 1897.)

(No Model.) 4 Sheets—Sheet 4.

UNITED STATES PATENT OFFICE.

THOMAS O. PERRY, OF CHICAGO, ILLINOIS.

FLUID-ACTUATED MOTOR FOR ACTUATING FLUID.

SPECIFICATION forming part of Letters Patent No. 641,405, dated January 16, 1900.

Application filed September 9, 1897. Serial No. 651,062. (No model.)

*To all whom it may concern:*

Be it known that I, THOMAS O. PERRY, a citizen of the United States, residing at Chicago, county of Cook, and State of Illinois, have invented certain new and useful Improvements in Fluid-Actuated Motors for Actuating Fluid, which are fully set forth in the following specification, reference being had to the accompanying drawings, forming a part thereof.

The purpose of this invention is to provide a motor or device for communicating power, in which the power is derived from fluid-pressure and is exerted upon other fluid, as for the purpose of compression, elevation, or other movement of the fluid acted upon. In the specific proportions and with the specific details of structure herein illustrated it is designed to be used as a hydraulic air-compressor—that is to say, the water under pressure being the motive fluid and the compression of air the resultant work.

My hydraulic air-compressor comprises a plurality of water-chambers alternating with a like plurality of air-chambers, each cylindrical and all arranged in a cylindrical group alternating, as stated, in order along the axis of such cylindrical group, and a like cylindrical group of valve-bodies having water-inlet and outlet ports and ports leading to the water-chambers, respectively, and piston-heads in such valve-bodies controlling the access and escape of water from the water-chambers, respectively. The air-chambers are separated from the water-chambers, respectively, by moving heads or diaphragms, which render both the water-chambers and the air-chambers collapsible and expansible by the movement of such heads, each water-chamber being expanded, while the air-chamber between it and the next fixed head is collapsed, and vice versa, and these moving heads or diaphragms are connected, respectively, to the piston-valves in the laterally-adjacent valve-bodies, and the water-passages from said valve-bodies controlled by said valves lead from the water-chambers, respectively, being so disposed that the valve operated by a given diaphragm controls the water-passages to water chamber or chambers other than that to which the diaphragm pertains.

A A A A are the air-chambers, and B B B B are the water-chambers.

C C C C are the moving heads or diaphragms, which intervene between each water-chamber and the air-chamber adjacent on one side, and D D D are fixed heads or partitions which intervene between the water-chambers, respectively, and the air-chambers adjacent on the other side, D' being the upper fixed head and D² the lower fixed head constituting the ends of the cylindrical group of air and water chambers.

E E E are valve-bodies arranged end to end, constituting a cylindrical pile or group laterally adjacent to the cylindrical group of air and water chambers, and E' and E² are respectively the upper and lower caps or end pieces of the group of valve-bodies, having, respectively, the water-inlet and water-outlet connections.

Figure 1:
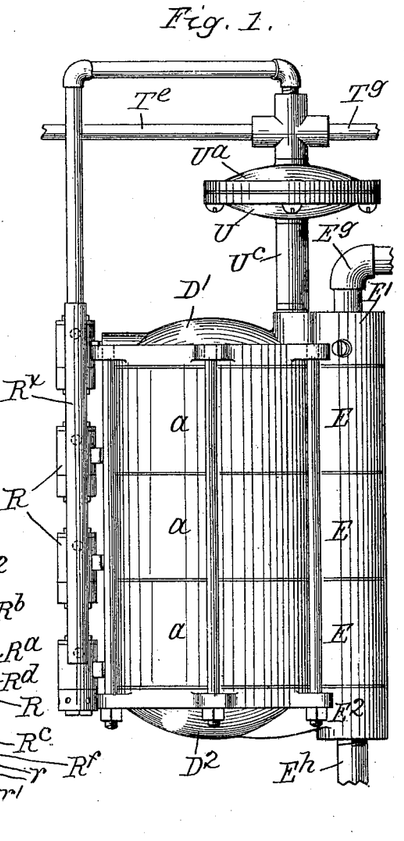
Figure 1 is a reduced side elevation of my improved hydraulic air-compressor.
Figures 2, 8, 9, 10, 11:
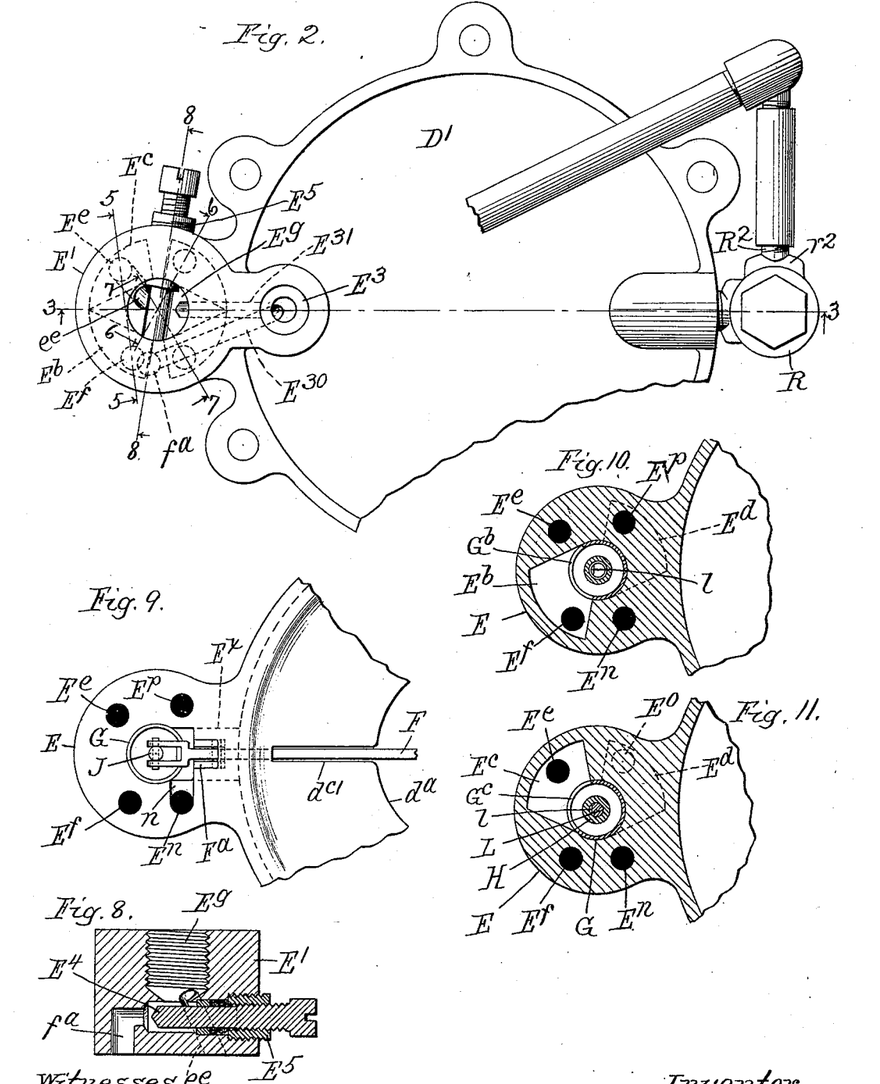
Fig. 2 is a full-sized plan of the same with a portion broken away and the governor and supply-pipe omitted.
Fig. 8 is a detail section continuing only through the upper plate of the valve-body at the plane indicated by the line 8 8 on Fig. 2.
Fig. 9 is a detail plan view of the valve-body portion of one of the water-chamber castings, showing the valve-operating lever and connections in position therein.
Fig. 10 is a detail section at the line 10 10 on Fig. 3.
Fig. 11 is a similar section at the line 11 11 on Fig. 3.
Figure 3:
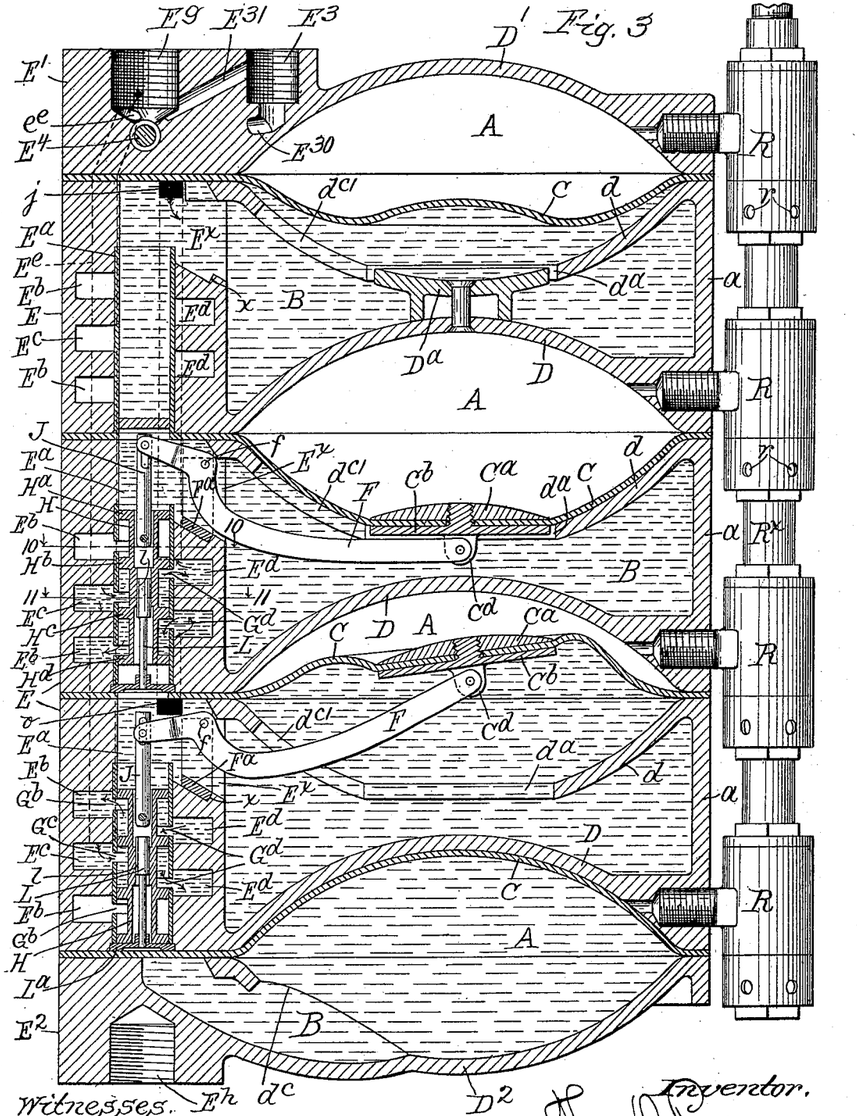
Fig. 3 is a vertical section at the line 3 3 on Fig. 2.
Figures 5, 6, 7:
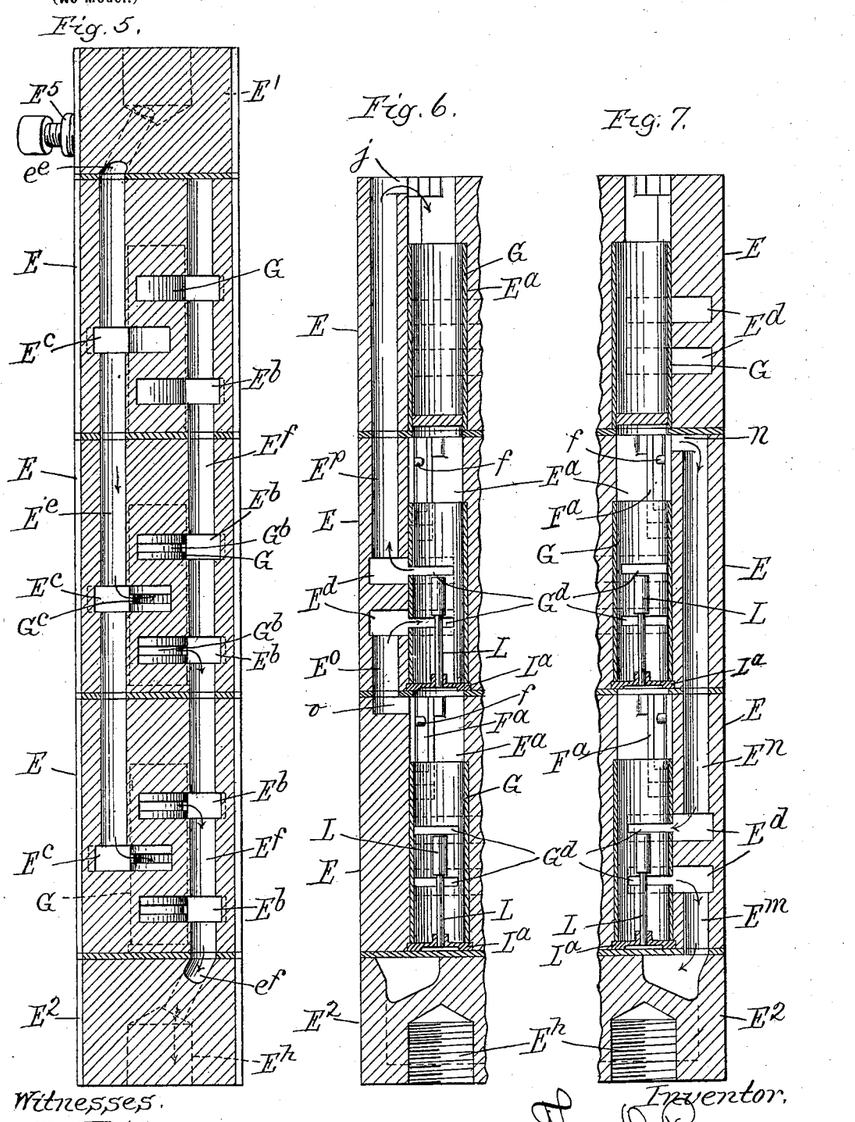
Fig. 5 is a detail section at the line 5 5 on Fig. 2.
Fig. 6 is a detail section at the line 6 6 on Fig. 2.
Fig. 7 is a detail section at the line 7 7 on Fig. 2.

As a matter of convenience and cheapness in the construction and assembling of the parts I cast integrally a fixed head D, an open head *d*, which seats the diaphragm C, the cylindrical wall *a* of a water-chamber, and a valve-body E, assembling as many such castings in group end to end as there are air-chambers, less one, and I cast integrally the fixed head D' and the upper water-inlet and casting E' of the valve-body group, and I cast integrally also the lower cap $D^2$ and the lower or water-outlet end casting $E^2$, and these five castings assembled coaxially—that is, the portions forming the air and water chambers being arranged coaxially and the several valve-bodies and the water inlet and outlet and castings being also arranged coaxially—constitute the entire body of the device in which the valves, diaphragms, and operating connections between diaphragms and valves are mounted and assembled and to which the air-controlling valves are connected. When thus assembled, the diaphragms C C C are securely bound at their margins, respectively, between consecutive castings and packing interposed at the same planes between the valve-bodies. The two intermediate diaphragms are clamped at the center between disks $C^a$ and $C^b$, the latter, which is on the lower side, having a lug $C^d$, to which is pivotally connected a lever F, designed to operate the piston-valve in the adjacent valve-body. The open head $d$ has a central aperture $d^a$ large enough to admit the disk $C^b$, said aperture constituting the opening in said head through which the water obtains access under the diaphragm. In case of the diaphragm in the upper chamber, which has no lever attached for reasons which will hereinafter appear, the aperture $d^a$ is partly occupied by a stool $D^a$, which is secured upon the upper side of the fixed head D below said aperture. This is for the purpose of seating the diaphragm when the air-chamber is fully expanded and preventing the diaphragm from bulging through the aperture $d^a$ with liability of injury to the diaphragm which would result. In the lowest chamber the lowest head $D^2$, having no central aperture, water obtains access under the diaphragm through the lateral aperture $d^c$. An aperture $d^{c'}$ is present in corresponding position in each of the other chambers, and in the two intermediate chambers it has the express function of affording a path for the lever F. Each of the valve-bodies E is cast with an axial bore or cylindrical passage $E^a$ and with lateral cavities $E^b$ $E^b$ and $E^c$ upon one side and lateral cavities $E^d$ $E^d$ on the other side, all these lateral cavities in the casting opening into the central or axial passage $E^a$. I line the axial passage $E^a$ with a brass tube G, which has ports corresponding in position to the mouths of the cavities $E^b$, $E^c$, and $E^d$, this brass tubing constituting the cylindrical seat for the piston-valve H. The form of the cavities $E^b$ $E^c$ and between $E^b$ and $E^c$, as seen in Figs. 10 and 11 in plan or as seen in transverse section through the valve body, is in the form of a sector of an annulus, less a portion cut off at one end, their mouth or opening at the axial passage extending around or about one-third of the circumference of said passage. The form of the cavity $E^c$, as seen in Fig. 11, is the reciprocal of that of the cavity $E^b$, being a portion of an annular sector, less a portion cut away opposite that at which the annular sector is mutilated to produce the form of the cavity $E^b$, and its mouth at the passage $E^a$ has the same circumferential extent about said passage, and its limits are in line with the limits of the mouths of the passages $E^b$. This relation between the forms of the cavities $E^b$ and $E^c$, causing them to overhang one another at a triangular portion, leaves them each with a portion at the end with which no portion of the other is in line. When the several castings are assembled in the entire structure, as described, all the cavities $E^c$ in all the castings may be connected by a passage $E^e$, which extends longitudinally parallel with the central passage $E^a$ through the end portions of the cavities $E^c$, the part of the passage $E^e$ in each casting registering with the corresponding parts of said passage in the adjacent castings. This passage $E^e$ constitutes the water-inlet passage and leads to the water-inlet connection $E^g$ in the casting E', in which a portion of said passage is bored obliquely, as indicated by the letter $e^e$. In like manner all the cavities $E^b$ in all the castings are connected by a passage $E^f$, made up of parts which extend longitudinally through each of the castings, registering with each other and connecting at the lower end of the lowest casting with the oblique passage $e^f$, which leads to the water-outlet $E^h$. The cavities $E^d$ $E^d$ are of a form similar to that of the cavities $E^b$ and $E^c$ and are formed in a casting by means of similar cores; but these cores are differently placed in the different castings in order to bring the cavities $E^d$ in the upper and lower castings E out of line at part of their extent with the corresponding castings in the middle casting E in order that longitudinal passages may be formed, as hereinafter described, extending between the extreme casting E and through the middle one without cutting or opening into the cavities $E^d$ in the middle casting, and that the other passages in like manner may be formed leading from the cavities $E^d$ in the middle casting into and partly through the end castings $E^e$ to the connection with the first encountered of the cavities $E^d$ in said extreme castings E. The arrangement of these communicating passages may be varied; but the arrangement which is shown in Figs. 5, 6, and 7 and which will now be described will indicate the purpose to be served by whatever arrangement is adopted and will guide in any desired modification in this detail. From the upper cavity $E^d$ in the lowest casting E a passage $E^n$ extends through the upper portion of said lowest casting E and through the entire extent of the middle casting E and at the upper end of the latter is extended by chipping out the metal at the upper end at $n$, so that said passage $E^n$ opens into the central passage $E^a$ at the upper end of the latter above the lining G, and since at this point a passage $E^x$ for the valve-operating lever, as hereinafter described, extends from the central passage $E^a$ entirely through the inner side of the casting and effects communication of said central passage with the water-chamber B said passage $E^n$ affords communication from the cavity $E^d$ of the lower casting E into the second water-chamber. From the lower cavity $E^d$ of the lower casting E the passage $E^m$ extends downward and opens into the lowest water-chamber, which is provided with a lateral extension terminating under the lowest valve-body. From the lower cavity $E^d$ in the middle casting (said cavity being on the opposite side from the passages $E^n$ and $E^m$) a passage $E^o$ extends downward to the end of said middle casting E and registers with a continuation thereof at $o$ in the upper end of the lower casting E, said continuation $o$ extending radially and opening into the central passage $E^a$ above the lining-tube G in the lower casting E, and thereby communication is afforded through the passage $E^x$, pertaining to the lower casting E, into the third water-chamber. From the upper cavity $E^d$ of the middle casting E a passage $E^p$ extends through the upper portion of the length of the middle casting E and through the entire length of the upper casting E, at the upper end of which a continuation $j$ is provided, leading radially into the central passage $E^a$ above the lining-tube G, and thereby affording communication through the passage $E^x$ of the upper casting E into the upper water-chamber. In the middle and lower casting E are piston-valves H H, each provided with four wings or piston-heads $H^a$, $H^b$, $H^c$, and $H^d$, respectively. These piston-heads are arranged with reference to the ports $G^b$ $G^b$ and $G^c$ in the lining-tube G, said ports leading from the cavities $E^b$ and $E^c$, respectively, so that the range of movement of said piston-valve which is not sufficient to carry any of the piston-heads past or onto any of the ports $E^b$ $E^b$ or $E^c$, the intermediate piston-heads $H^b$ and $H^c$ may travel from one side to the opposite side of the ports $G^d$, and said piston-heads are of such width that for an instant they completely close said ports in passing them.

The fulcrum for the lever F in each case is provided on a standard $F^a$, which is U-shaped, but angular at the bends, the two upstanding branches or lugs being adapted to receive between them the lever, which is pivoted to them by the pin $f$. This standard $F^a$ is lodged in a passage $E^x$, cut through the casting E from the central passage $E^a$ into the water-chamber B, the width of the passage being sufficient only to receive the standard $F^a$, the lower side or bottom of said passage being formed aslant and with a shoulder or step $x$, and the lower side or foot of the standard $F^a$ is at an angle to the edges of the upstanding lugs between which the lever F is pivoted, corresponding to the slant of the bottom of the passage $E^x$, so that said standard after the lever has been inserted between its lugs and secured by the pivot-pin may be set into the passage $E^x$ from the upper end of the casting E and lodged on the slant bottom and against the shoulder $x$ and be thereby definitely stopped, the pivot-pin being also retained against the possibility of escape by the fact that the standard is closely fitted within the passage. The inner end of the lever F is pivotally connected to a link J, which is slotted longitudinally at such connection to allow it to play on the pivot, said link being extended downward from said connection with the lever and pivotally attached to the piston-valve H, the valve being axially apertured and the link extending down into the aperture, but not fitting closely, and thereby gaining length and adapting it to actuate the piston-valve with less liability to sideward or cramping movement. To prevent the valve, which as to the pressure of the water upon it is balanced, as will hereinafter appear, from a tendency to settle downward by its weight, I provide a drag or friction-brake device, consisting of the finger L, rooted in a disk or plate $L^a$, which closes the bottom of the axial passage $E^a$, said finger extending up into the axial cavity of the piston-valve stem and being enlarged at its upper end, so that it fits, but not tightly, in said cavity, and the stem is given a slight bend sideward, so that it has a tendency to bear at one side, and thus act as a brake on the piston, and because it is desirable that the passage of water should be free the enlarged end of the finger constituting the drag is cut away a little at one side, as shown at 1.

Figure 4:
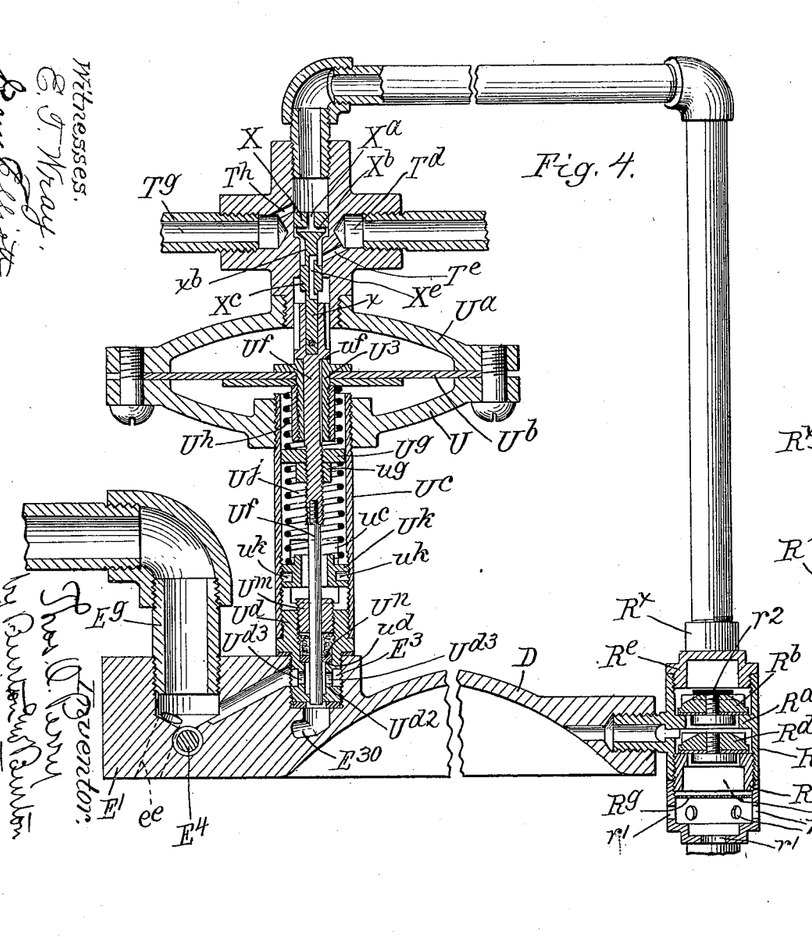
Fig. 4 is an axial section of the governor and one of the air-controlling valves and upper cap-plate of the water-chamber and water-controlling valve-body at the plane of the line 3 3 on Fig. 2.

Inlet and outlet valves for the several air-chambers are all of the same form which is shown in Fig. 4, wherein R is the T-shaped body, having the stem of the T connected to the air-chamber A. $R^a$ is an annular interior boss on which the outlet-valve $R^b$ seats at the outer side. $R^c$ is a chambered inlet-plug screwed into the body R and having its inner end at the position suitable to serve as a seat for the inlet-valve $R^d$. The valves $R^b$ and $R^d$ are of considerable diameter in proportion to their range of movement, which is very slight, the valve $R^b$ being stopped by the plug $R^c$ with only about one-sixteenth-of-an inch movement from its seat and the valve $R^d$ being stopped with like range of movement by the inner side of the annular boss $R^a$. The inlet-plug $R^c$ has a chamber $R^f$, which is designed to be filled with suitable fibrous material to strain the dust out of the air, the same being retained by a perforated disk $R^g$. The air enters through the lateral ports $r$ $r$ $r$ and the end port $r'$. The air escapes through the lateral port $r^2$, which leads through a nipple $R^2$. From said nipples on all of the air-controlling valve-bodies connection is made to a common pipe $R^x$, leading to a compressed-air chamber or other place of use of compressed air.

In operating this device it is essential in the first place that the air should be driven out of the water-chambers. To this end the openings $E^x$ are located so that they afford egress for the air from the highest point at which the air can be left in the chambers, respectively, when the diaphragms are depressed; but notwithstanding this location the complete displacement of the air from the chambers involves some difficulty and cannot be entirely accomplished without special provision for the purpose, because the air after being forced out of the water-chambers at the passages $E^x$ as the water fills the chambers in the first instance must find its way into the outlet-pipe by passing downward by the same course by which the water will afterward find the same outlet, and when the water begins to occupy these passages it will hold the air bound at the highest point of the passages, respectively, and with the air thus retained the evacuation of the water-chambers, which is effected practically by the suction of the outgoing water, is prevented. To overcome this difficulty, I provide for establishing communication between the outlet-passages, so that the water when admitted to the inlet-passage, in addition to occupying the water-chamber, so far as it may under the control of the valves, also flows directly through the outlet-passage, thereby constituting a current past the mouth of the passages through which the air must be drawn out, and such current operates in a short time to take the air out by friction and suction and permit the water-chambers to be perfectly filled and evacuated. To effect such communication between the inlet and outlet passages and provide for opening and closing it at will, I cut a passage $f^a$ from the upper end of the passage $E^f$, leading into the water-inlet connection, (shown at $E^g$,) and transversely across that connection I set in a valve $E^4$ through a suitable plug $E^5$, and such valve seats at the mouth of the passage $f^a$. By opening this valve the water admitted through the inlet passes partly through the passage $f^a$ into the outlet-passage $E^f$, and, flowing through that passage, it will pass all the open ports leading from the water-chambers, respectively, and will tend to draw the air out of the water-chambers through said ports in every instance in which the position of the valve is such as to open communication with the water-chambers. After operating for a short time in this manner the water-chambers will be found practically exhausted of air, the range of movement of the diaphragms increasing until the air is all out. When the result is accomplished, so that the diaphragms obtain their full movement, the valve $E^4$ will be closed.

Another means of effecting the communication between the inlet and outlet passages adapted to be controlled by the governor or pressure-reducer is illustrated in the drawings and will now be described.

I form by drilling into the upper end of the upper casting comprising the cap $D'$ and the inlet end piece $E'$ a cavity $E^3$, which is interiorly threaded for the purpose of affording attachment for a governor or pressure-reducer, hereinafter described, and from the bottom of this cavity I extend a passage $E^{30}$ obliquely downward to the opposite passage $f^a$, and I drill also another passage $E^{31}$ from the inlet-pipe connection $E^g$ to the upper part of the cavity $E^3$. When the water is admitted to the inlet, in addition to flowing through the ordinary inlet-passage a portion will pass by the duct $E^{31}$, cavity $E^3$, and passage $E^{30}$ to the outlet-passage $E^f$. I mount the governor or pressure-reducer at $E^3$ and adapt it to automatically open and close this communication after the air is drawn out of the water-chambers. I will now describe this governor or pressure-reducer. It is illustrated in Fig. 4, which shows it in connection with the upper casting of the hydraulic air-compressor. A chamber formed of two concave disks $U$ and $U^a$ is partitioned by a flexible diaphragm $U^b$, bound at its outer margin between the disks at the margins of the latter. Into the disk $U$, at the center, there is screwed a tube $U^c$, which constitutes a stem for said disk, which at the other end is screwed into the plug $U^d$, which in turn is screwed into the threaded cavity $E^3$ in the upper side of the upper casting of a compressor. To the diaphragm, at its center, there is secured a sleeve $U^3$, through which extends a rod $U^f$, which is stopped on the sleeve by a shoulder $u^f$ above the diaphragm and has screwed onto it below the sleeve $U^3$ a nut $U^g$, provided with a jam-nut $u^g$, and between the nut and the diaphragm there is interposed a spring $U^h$, coiled about the sleeve and reacting against the diaphragm and nut with a tendency to hold the rod $U^f$, with its shoulder $u^f$, stopped above the diaphragm, so that unless the spring is compressed the rod $U^f$ will operate as if rigidly attached to the diaphragm and will in any event operate in that manner in the direction necessary to depress the diaphragm or resist its upward movement. Within the tube $U^c$, below the nut $U^g$, is another coiled spring $U^j$, reacting at its upper end against the lower side of the nut and at its lower end against a nut $U^k$, which is apertured axially, so that the rod $U^f$ extends freely through it, the nut itself being screwed onto the tube $U^c$, which is interiorly threaded for some distance from its lower end for that purpose. This nut is adapted to be rotated by a lever-pin inserted in radial sockets $u^k$, the tube $U^c$ having an extended opening $u^c$ at one side, through which such a lever-pin may be inserted to rotate the nut. The rod $U^f$ is reduced in diameter below the thread provided to receive the nut $U^g$ and extends down through the plug $U^d$, passing through the packing-collar $U^m$, which is screwed into the upper end of the plug, and through a washer $U^n$, which is stopped on the shoulder $u^d$, near the lower end of the plug, so that the packing material may be compressed between it and said packing-collar. The plug $U^d$ has a reduced portion at $U^{d2}$ a little below its lower end, and a plurality of radial ports $U^{d3}$ lead from its central cavity below the washer $U^n$ into the reduced portion, and thereby affords communication into the cavity $E^3$. The lower end of the plug opens into the passage $E^{30}$, and the lower end of the rod $U^f$ is adapted to act as a valve to close said opening when thrust thereinto. It will be seen that the sleeve $U^3$ and the rod $U^f$ together constitute a stem for the diaphragm which is extensible against the resistance of the spring $U^h$.

The sleeve $U^3$ is extended above the diaphragm and guided in a plug which is screwed into the center of the upper disk $U^a$ by wings which leave free passage of air around the stem through the plug. Said plug is the lower end of a cross T, which is bored through vertically, and at the upper end has a connection leading from the compressor to admit the compressed air. To the diaphragm-stem there is connected, as an extension above the diaphragm, the valve-stem $x$.

X is a piston-valve formed at the upper end of the stem $x$ and adapted to seat downwardly in the vertical passage through the cross T. At the end of the valve an aperture $X^a$ is formed, extending axially a short distance and communicating with transverse ports $X^b$, below the piston portion and in or above the seating-surface of the valve. The valve-stem is reduced at $X^b$ for a short distance below the valve to afford air-passage and is then enlarged at $X^c$ to a piston which fully occupies the passage and is provided with a duct $X^e$, opening laterally above and below the enlarged or piston portion $X^c$. The two horizontal arms of the cross T are designed to be connected one to a reservoir and the other to an outlet for compressed air leading to the place of use. From the latter outlet-port $T^d$ a passage $T^e$ leads into the vertical passage, into which it opens at a point opposite the reduced portion $X^b$ of the valve-stem, below the valve when the latter is at its seat, or at an open position corresponding to what may be termed a "normal" position of the diaphragms—that is, a position occupied by the diaphragm when the back pressure is that for which the governor is adjusted. The outlet $T^g$, leading to a reservoir, is provided with a communicating passage $T^h$, leading from the pump-inlet connection above the valve. The operation of this governor is that when the compressed air admitted from the compressor enters above the valve X it finds its way through the axial and transverse ports in said valve, past the upper or piston portion of the valve, and if the valve is off its seat, as would be the case normally, owing to the inward pressure of the spring $U^j$, it reaches the passage $T^d$ and passes out into the outlet, a portion at the same time passing directly by the duct $T^h$ into the reservoir, if one is attached. Whatever back pressure is exerted from the work done back through the outlet will reach the diaphragm by way of the by-pass $X^e$, and if the spring $U^j$ is adjusted for pressure of, say, five pounds to a square inch of diaphragm whenever the back pressure exceeds that amount the diaphragm will be depressed and the valve will be seated, cutting off thus the access of compressed air to the outlet and causing it to be accumulated in the reservoir until the use of air at the outlet diminishes the back pressure and permits the valve to rise and admit a fresh supply. In case the supply of compressed air fails or in case at starting there is no supply the action of the spring $U^j$ will lift the diaphragm above the horizontal position, carrying the pistons X and $X^c$ across the mouths of the passages $T^c$ and $T^h$, cutting off communication both with the reservoir and with the outlet, but leaving communication by way of the by-pass $X^e$ with the inlet from the compressor. Such upward movement of the diaphragm withdraws the lower end of the rod $U^f$ from the port leading into the passage $E^{30}$, and thereby opens communication between the inlet and outlet passages of the compressor, thus permitting the action of the water to exhaust the air from the water-chambers of the compressor and get it into working condition. The special utility of this feature is that it provides not only for automatically establishing the connection between the water inlet and outlet ports, as is necessary at starting, but also for disposing of the air, which in the course of continuous operation of the device frequently accumulates in the water-chamber, because the water carries a considerable quantity of air, which is forced out of it by the pressure to which it is subject in the chambers. Whenever this occurs the supply of compressed air failing will cause the governor to act in the manner described and open communication between water inlet and outlet automatically as frequently as necessary to keep the water-chamber free from air. It is not safe to rely upon the valve X being so perfectly air-tight that there shall be no leakage past it, and in case of leakage it is evident that the pressure might not be prevented even by the seating of the valve from rising beyond the predetermined point for which the spring $U^j$ is adjusted.

It will be noticed that the rod $U^f$, which constitutes part of the diaphragm, while operating positively as such stem in a downward movement or to resist an upward movement of the diaphragm, may move upward without affecting the diaphragm, merely sliding through the sleeve $U^f$. Such sliding is prevented when the pressure is not more than desired by the spring $U^h$, which is too stiff to yield until the pressure exceeds the tension of the spring $U^j$, the former spring being adjusted to a pressure, say, of six pounds if the spring $U^h$ is adjusted to five pounds, and when the pressure reaches six pounds the spring $U^h$ will yield and the sleeve $U^f$ will slide on the stem, leaving the shoulder, which stops it at the upper end. Now the seat at the shoulder is designed to be air-tight, but the rod is not air-tight in the sleeve, and as soon as the seat leaves the shoulder the air can escape from above the diaphragm, passing out through the sleeve and through the opening $u^c$.

I claim—

1. A fluid-actuated device for actuating a fluid, which comprises a plurality of cylinders having each a movable head or diaphragm, such cylinders being assembled in series end to end, with intervening fixed heads, and fixed heads at the ends of the series; whereby there are formed chambers in couples which are separated by fixed heads, the individuals of each couple being separated by the movable heads or diaphragms, one of the chambers of each couple having inlet and outlet valve controlled connections for the actuated fluid, and the other chamber of each couple having inlet and outlet valve controlled connections for the actuating fluid.

2. A fluid-actuated device for actuating a fluid which comprises a plurality of cylinders having each a movable head or diaphragm, such cylinders being assembled in series end to end, with intervening fixed heads and fixed heads at the ends of the series; whereby there are formed chambers in couples which are separated by the fixed heads and individuals of each couple being separated by the movable heads or diaphragms, one of the chambers of each couple having inlet and outlet valve controlled connections for the actuated fluid, and the other chamber of each couple having inlet and outlet valve controlled connections for the actuating fluid, in combination with mechanical connections for moving the heads or diaphragms to the valve which controls the actuating fluid, said connections from such head or diaphragm of any chamber being extended to and adapted to operate a valve of another chamber.

3. A hydraulic air-compressor comprising a plurality of cylinders having each an open end and a fixed head closing the opposite ends and a movable head or diaphragm between the ends and inclosing an air-chamber between itself and the fixed head, such cylinders being assembled, the closed end of one to the open end of the next, whereby a water-chamber is inclosed between the fixed head of one cylinder and the movable head of the next; suitable air inlet and outlet valves for the air-chambers, and water inlet and outlet valves for the water-chambers, and mechanical connections for the moving heads to the water-controlling valves respectively, the valve pertaining to one water-chamber being actuated by the moving head pertaining to another.

4. In combination with the water-chambers and the water-controlling valves thereof, the valve-bodies having axial valve-seats and piston-valves therein and having inlet and outlet ports and other ports leading to the water-chambers respectively, each valve being actuated by the diaphragm of a water-chamber with which the ports controlled by such diaphragm do not communicate.

5. In combination with the water-chambers, the water-controlling valves thereof having bodies provided with axial seats, and communications therefrom to the water-chambers respectively, the piston-valves which control such communication, said bodies having lateral inlet and outlet cavities opening into the valve-seat at the same side thereof, the inlet-cavities extending in one direction farther than the outlet-cavities, and the outlet-cavities extending in the other circumferential direction farther than the inlet-cavities; a longitudinal passage connecting all the inlet-cavities where they extend beyond the outlet-cavities, and a longitudinal passage connecting all the outlet-cavities where they extend beyond the inlet-cavities.

6. In combination with the water-chambers and the diaphragms thereof, the valve-bodies located laterally with respect to the water-chambers, the piston-valves operating in such bodies, the latter having passages leading from the valve-stems to the adjacent water-chambers respectively, and lever connections extending through said passages from the diaphragms to the valve-stems respectively, said passages serving also as water inlets and outlets for the water-chambers.

7. In combination with the water-chambers and the diaphragms thereof, the valve-bodies located laterally with respect to the water-chambers, the piston-valves operating in such bodies, the latter having passages leading from the valve-stems to the adjacent water-chambers respectively, and lever connections extending through said passages from the diaphragms to the valve-stems respectively; the valve-cavities $E^d$ communicating with the valve-seat, and ducts leading from such cavities respectively in one body to the lever-passages in other bodies, whereby, each valve operated by such lever connections controls the flow of water to and from the chamber whose diaphragm operates another valve.

8. In combination with a water-chamber and the diaphragm thereof, the valve-body laterally adjacent thereto having a passage for the valve-operating lever, such lever extending in such passage from the diaphragm to the valve-stem respectively, said passage having an inclined bottom and shoulder and the lever-fulcrum standard stepped and stopped on said bottom and shoulder respectively.

9. In combination with a plurality of water-chambers and their respective diaphragms, the valve-bodies laterally adjacent to the water-chambers respectively, having a passage for the valve-operating lever, the lever extending in such passage from the diaphragm to the valve-stem, and said passage having an inclined bottom and shoulder and extended from the top of the valve-body in which it is formed, the lever-fulcrum standard lodged in such cavity and stepped and stopped on the bottom and shoulder thereof respectively, and extending to the top of the body, whereby it is adapted to be stopped by such interposed valve-body and bound between the same and the inclined bottom and shoulder.

10. In combination with a plurality of water-chambers, the valve-bodies laterally adjacent thereto respectively, having each a passage for a valve-operating lever, such lever extending from the water-chamber through the passage to the valve-stem, the lever-fulcrum standard comprising two uprights between which at the upper ends, the lever is pivoted, the passage in the body being adapted to receive said standard and embrace it closely at the upper end, whereby the lever being pivotally attached to the standard, has its pivot retained against endwise displacement when the standard is lodged in the passage.

11. In combination with the water-chamber and the valve-body adjacent thereto respectively and the valves operating therein, said bodies having each a passage leading into the adjacent water-chamber and having a cavity $E^d$ communicating with the valve-seat and a duct leading from such cavity to the water communicating passage of another valve-body.

12. In combination with the expanding and collapsing chamber, the valve which controls the flow of fluid to cause its expansion and collapse comprising a body having inlet and outlet ports at one side and ports at the other side which lead to the chambers, and a piston-valve having wings which seat beyond the inlet and outlet ports in both directions, and other wings which seat between the inlet and outlet ports, the ports leading to the chambers being located opposite the intervals between the inlet and outlet ports.

13. In combination with the water-chambers and the water-controlling valves thereof having inlet and outlet ports, inlet and outlet passages to the valve-seats and a duct which connects the outlet-passage to the inlet-passage at a point between which and the final outlet, the outlet-ports of the valves are located, and means for opening and closing such duct at will.

14. In combination with the water-chambers and the water-controlling valves thereof having inlet and outlet ports, inlet and outlet passages to the valve-seats and a duct which connects the outlet-passage to the inlet-passage at a point from which the water flowing through the outlet-passage to the final outlet passes the outlet-ports of the valve, and a governing device which opens such duct when the air-pressure falls below a predetermined point.

15. In combination with a hydraulic air-compressor, a pressure reducer or governor comprising a valve interposed in the compressed-air conduit, a chamber to which air-pressure is admitted from a point beyond such valve, a diaphragm in such chamber and mechanical connections by which the diaphragm operates the valve, and a spring acting upon such diaphragm to resist its movement in a direction tending to seat the valve.

16. In combination with a hydraulic air-compressor, a pressure reducer or governor comprising a valve interposed in a compressed-air conduit, a chamber to which air-pressure is admitted from a point beyond such valve, a diaphragm in such chamber, and mechanical connections by which the diaphragm operates the valve, a spring acting upon the diaphragm to resist its movement in a direction tending to seat the valve, and to impel it in the opposite direction, the mechanical connections from the diaphragm to the valve being extensible under pressure upon the diaphragm in the direction which seats the valve, and a spring which resists such extension, and a waste-passage for air, which is opened by such extension.

17. In combination with a hydraulic air-compressor, a governor comprising a chamber to which the compressed air is admitted and a diaphragm exposed to the pressure of such air in such chamber, a valve connected to the diaphragm and operating to control communication between the water inlet and outlet passages of the compressor, and a spring operating upon the diaphragm in a direction tending to resist the air-pressure and move the diaphragm to open the valve.

18. In a hydraulic air-pump, an expansible and collapsible water-chamber and valves and their operating connections for controlling the admission and discharge of water to and from such chamber, said chamber having a vent-passage leading from the highest point of the same when in collapsed condition into the water-outlet passage.

In testimony whereof I have hereunto set my hand, in the presence of two witnesses, at Chicago, Illinois, this 28th day of August, 1897.

THOMAS O. PERRY.

Witnesses:
CHAS. S. BURTON,
JEAN ELLIOTT.